Figure 1:
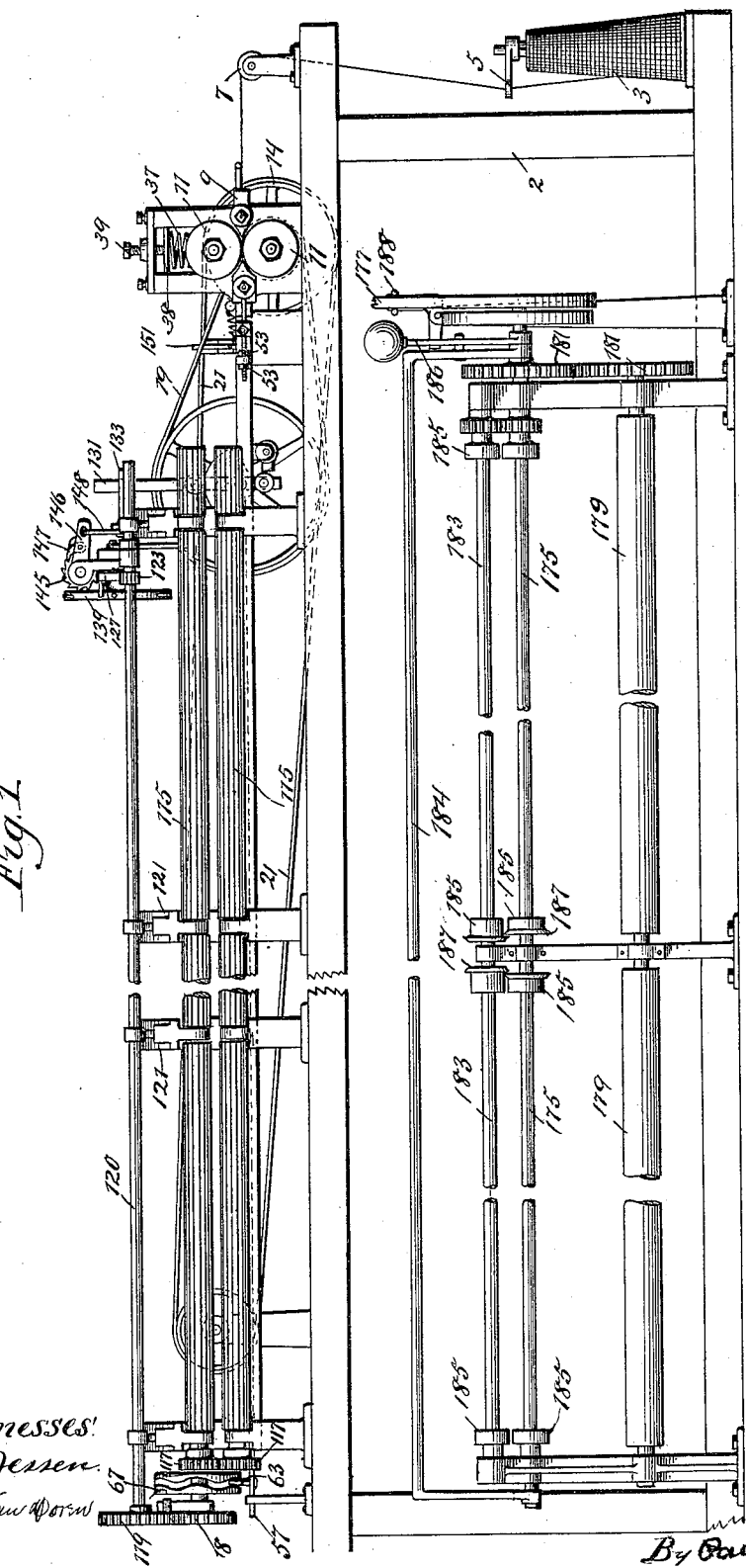

(No Model.) 6 Sheets—Sheet 1.

C. O. WHITE & M. B. LLOYD.
APPARATUS FOR WEAVING COILED WIRE FABRICS.

No. 461,695. Patented Oct. 20, 1891.

Witnesses:
J. Jessen
O. D. Van Doren

Inventors.
Clarence O. White,
Marshall B. Lloyd.
By Paul —— Attys.

(No Model.) 6 Sheets—Sheet 2.

C. O. WHITE & M. B. LLOYD.
APPARATUS FOR WEAVING COILED WIRE FABRICS.

No. 461,695. Patented Oct. 20, 1891.

Fig. 2.

Witnesses.
J. Jessen
C. E. Van Dorn

Inventors.
Clarence O. White
Marshall B. Lloyd.
By Paul Emerson Att'ys (No Model.) 6 Sheets—Sheet 3.
C. O. WHITE & M. B. LLOYD.
APPARATUS FOR WEAVING COILED WIRE FABRICS.
No. 461,695. Patented Oct. 20, 1891.
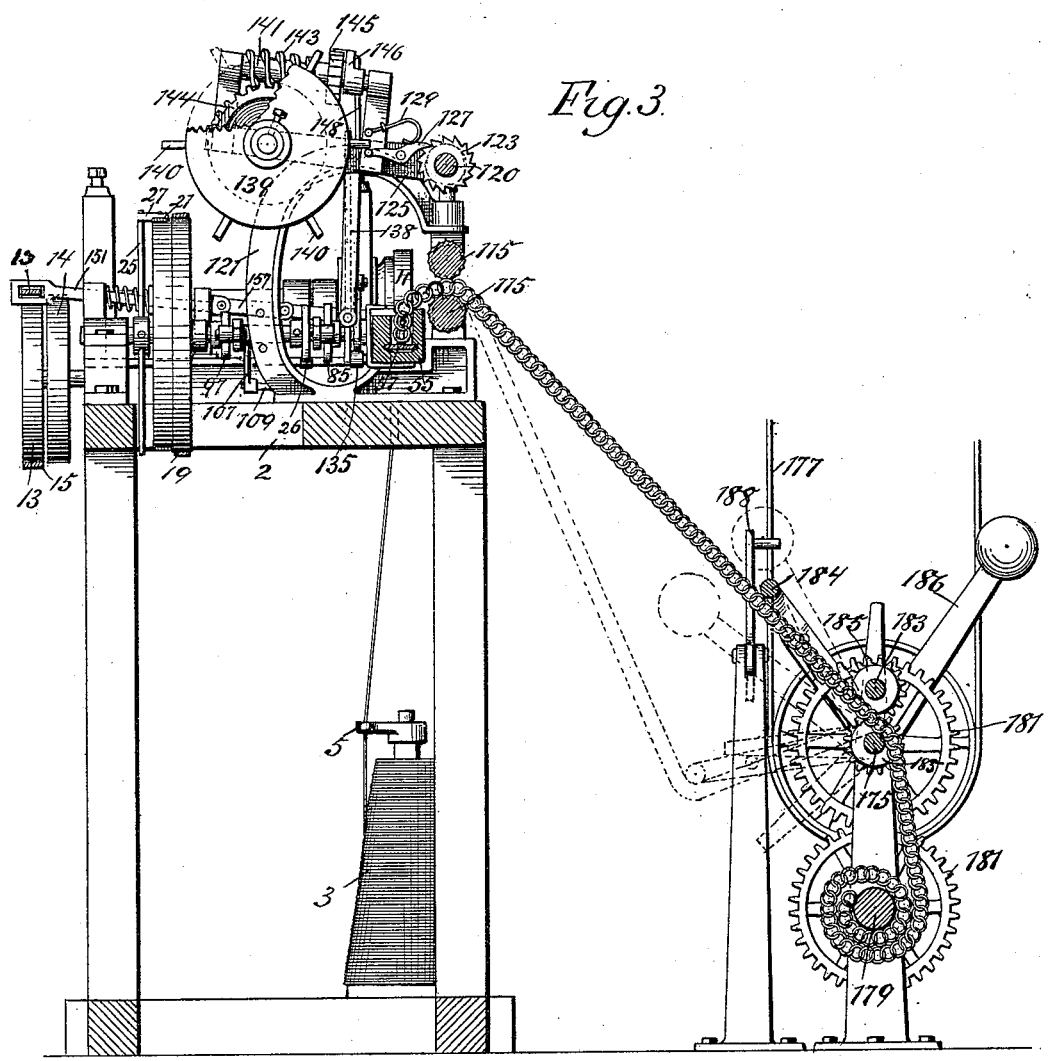
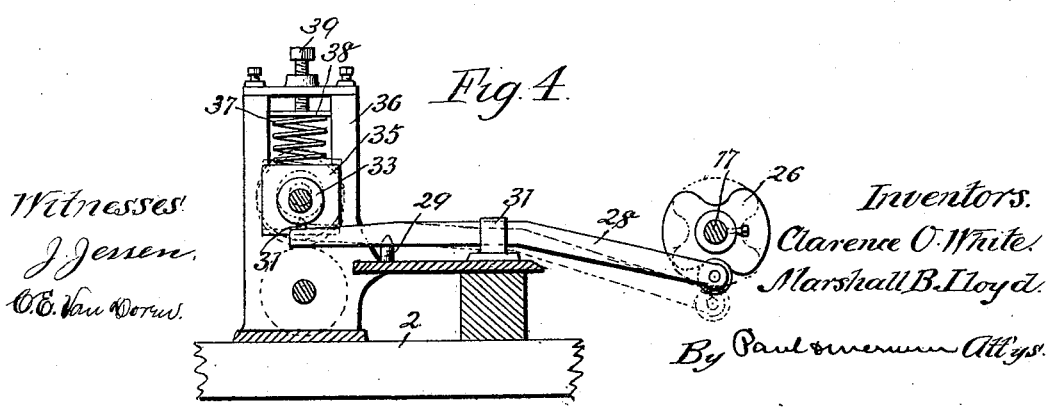
Witnesses
J. Jensen.
O. E. Van Doren.
Inventors.
Clarence O. White
Marshall B. Lloyd
By Paul Sweenum Att'ys.

(No Model.) 6 Sheets—Sheet 4.
C. O. WHITE & M. B. LLOYD.
APPARATUS FOR WEAVING COILED WIRE FABRICS.
No. 461,695. Patented Oct. 20, 1891.
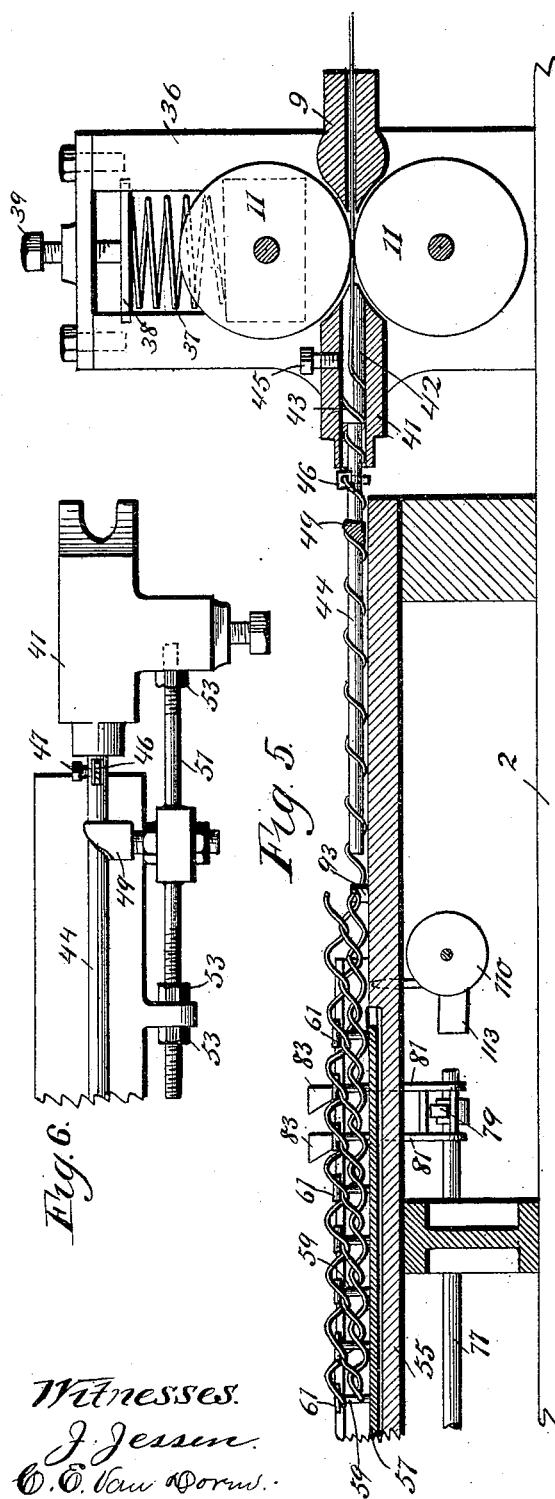
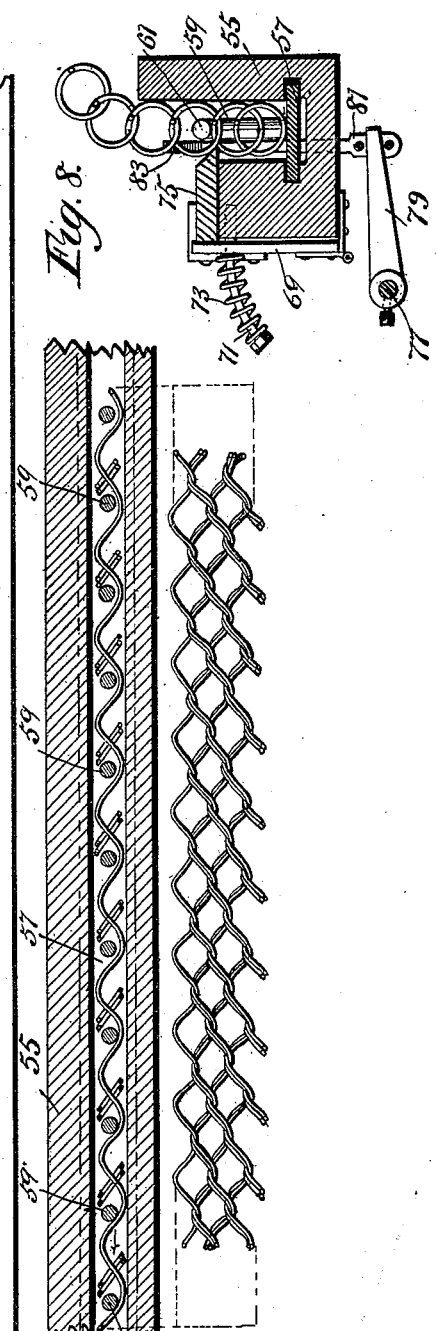
Witnesses.
J. Jessen
O. E. Van Dorn
Inventors
Clarence O. White
Marshall B. Lloyd
By Paul Merwin Attys (No Model.) 6 Sheets—Sheet 5.
C. O. WHITE & M. B. LLOYD.
APPARATUS FOR WEAVING COILED WIRE FABRICS.
No. 461,695. Patented Oct. 20, 1891.
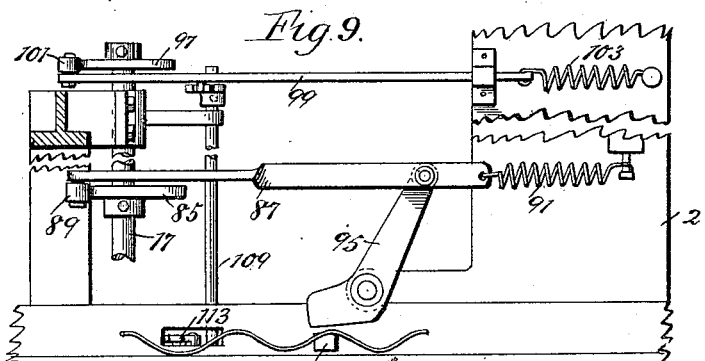
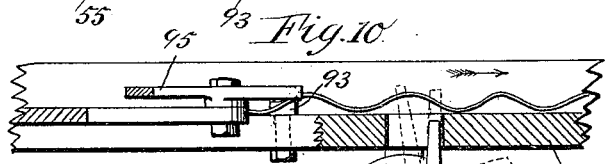
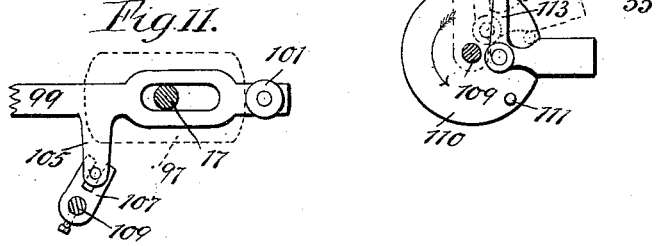
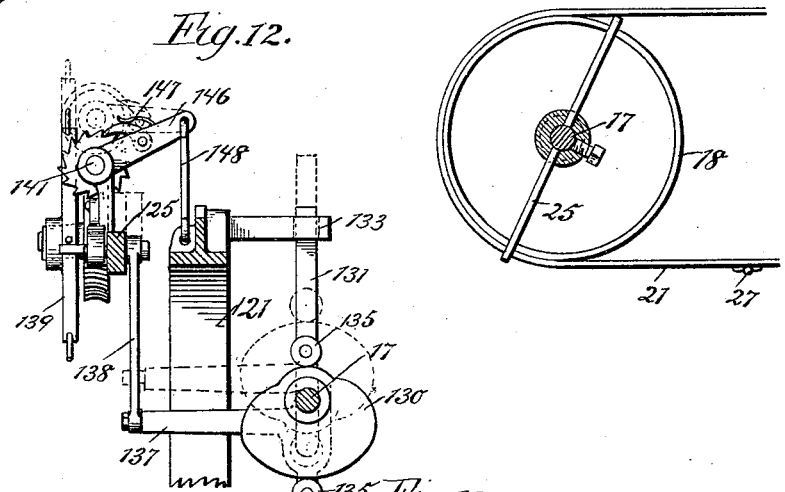
Witnesses.
J. Jessen
C. E. Van Doorn
Inventors.
Clarence O. White
Marshall B. Lloyd
By Paul & Merwin Attys (No Model.) 6 Sheets—Sheet 6.
C. O. WHITE & M. B. LLOYD.
APPARATUS FOR WEAVING COILED WIRE FABRICS.
No. 461,695. Patented Oct. 20, 1891.
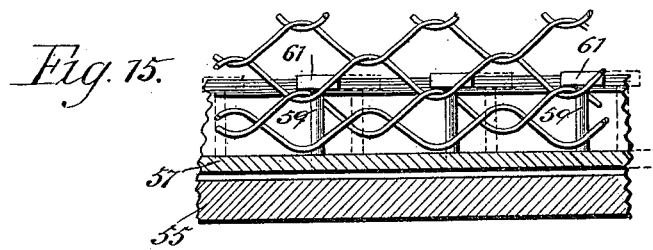
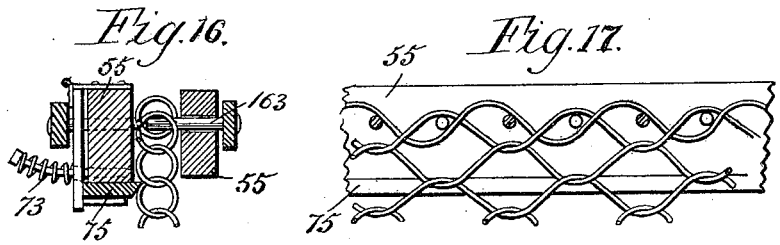
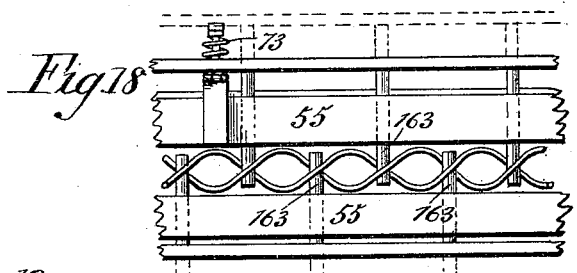
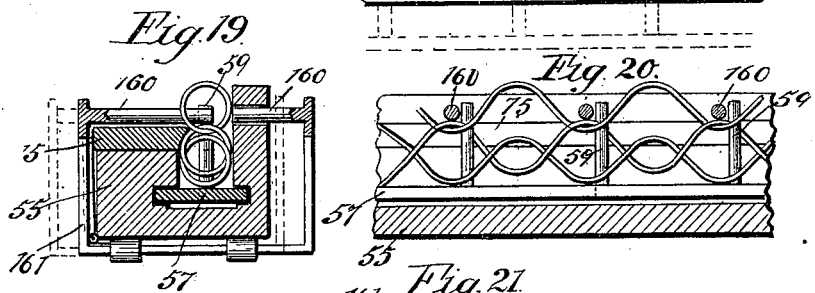
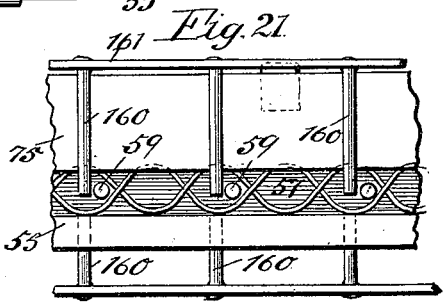
Witnesses
J. Jessen
C. E. Van Doren
Inventors
Clarence O. White
Marshall B. Lloyd
By Paul Emerson
Attorneys.
THE NORRIS PETERS CO., PHOTO-LITHO., WASHINGTON, D. C.

UNITED STATES PATENT OFFICE.

CLARENCE O. WHITE AND MARSHALL B. LLOYD, OF MINNEAPOLIS, MINNESOTA, ASSIGNORS TO THE WOVEN WIRE MACHINERY COMPANY, OF SAME PLACE.

APPARATUS FOR WEAVING COILED-WIRE FABRICS.

SPECIFICATION forming part of Letters Patent No. 461,695, dated October 20, 1891.

Application filed August 22, 1890. Serial No. 362,725. (No model.)

*To all whom it may concern:*

Be it known that we, CLARENCE O. WHITE and MARSHALL B. LLOYD, of Minneapolis, in the county of Hennepin and State of Minnesota, have invented certain new and useful Improvements in Apparatus for Weaving Coiled-Wire Fabrics, of which the following is a specification.

Heretofore it has generally been customary in weaving fabrics of this kind to run the coils of wire from the coiler onto a suitable table or support, upon which the coils lay loosely, and as each coil was projected from the coiler it was made to run forward into a coil of the fabric already woven, generally into the last coil. Where no means is used for guiding the wire as it passes over the table or support after it leaves the coiler, it is necessary to rely upon the shape of the coil to insure its interlocking with the preceding coil. There is therefore no control over the coil of wire after it leaves the coiler, and if the end of the coil strikes the wire of the fabric or if there is too much friction upon the forward end of the coil the wire will double up at some point in its length, generally at a point near the coiler, or will not interlock with the preceding coil, thus making it necessary to remove the coil and run the wire over again. There are also other disadvantages arising from the lack of control of the coil after it leaves the coiler. We seek to obviate these objections by providing a method of running the wire so that it is always under control and its path as it advances may be accurately predetermined. We accomplish this result by causing the wire, after it leaves the coiler, to engage a series of pins, by each one of which the coil is slightly stretched or distended, so that as the coil advances its forward end bears against the pins and considerable tension is therefore brought upon the wire from the coiler throughout its full length. We thus accurately determine the path of the wire and obtain complete control over it throughout the full length of the coil. We run as many wires as may be desired for each coil, and then by moving the pins we run the next coil so as to interlock with the coil or coils preceding. We also provide means for varying the size of the coil by causing it, after it leaves the coiler, to engage an adjustable guide or guides, by which the length of the diameter of the spiral may be changed and given a permanent set.

Our invention consists, further, in means for stopping the machine automatically in case the wire becomes doubled up in front of the coiler.

Other features of our invention will be hereinafter set forth in the following detailed specification and claims.

In the accompanying drawings, forming a part of this specification, Figure 1 is a side elevation, partly broken away, showing our improved machine. Fig. 2 is a plan view of the same. Fig. 3 is a transverse section on line $x\ x$ of Fig. 2, looking in the direction of the arrow. Fig. 4 is a detail showing the means for separating the feed-rolls. Fig. 5 is a detail section of a portion of the machine, showing the feed-roll, the coiler, and a portion of the guide-pins. Fig. 6 is a detail of a portion of the coiler, showing also the adjustable guides for regulating the size of the coil. Fig. 7 is a detail section showing the trough-like receptacle in which the wire is run and in which the guide-pins are arranged, and illustrating also the manner of stretching the wire by passing it in contact with the pins, and showing also in detail a section of the wire fabric after it has been removed from the pins and has returned to the position that it naturally assumes after the tension arising from its contact with the pins is removed. Fig. 8 is a transverse section of the receiver in which the pins are located, showing also the means for holding the coils in the receiver and the movable support upon which the guide-pins are located and the means that we prefer to use for preventing the coils from drawing back with the pins and remaining in contact with them when the pins are moved for the running of the next coil. Fig. 9 is a detail plan view of the wire-cutting mechanism and of the means for moving the last coil run in order that another coil may be run by the side of it. Figs. 10 and 11 are details of the mechanism shown in Fig. 9. Fig. 12 is a detail of the mechanism for feeding the fabric and for intermitting the feed when extra wires are to be added to the coils. Fig. 13 is a detail of the automatic stop mechanism for stopping the machine in case the wire becomes accidentally doubled up in front of the coiler. Fig. 14 is a detail of the belt mechanism for operating the cam-shaft controlling the cutter and other parts of the machine. Fig. 15 is a detail showing the manner of holding the fabric by means of cross-heads on the pins and the manner of releasing the fabric by moving the pins. Figs. 16, 17, 18, 19, 20, and 21 are details showing modified devices for holding the coils in the receiver.

In the drawings, 2 represents a suitable frame by which the parts of the mechanism are supported. This frame may be of any suitable size and construction and formed of any suitable material. 3 represents a coil of wire, which may be supported in any convenient position upon or adjacent to the frame of the machine, and it is provided with a rotating guide 5, through which the wire passes from the spool. The wire may then pass over a suitable guide-wheel 7 and through a guide 9 to the feed-rolls 11. The feed-rolls 11 are mounted upon suitable shafts supported in bearings upon the frame of the machine. The shaft of one wheel—as here shown the lower—is provided with a suitable belt-pulley 13, fixed thereon, and with a loose pulley 14, and receives power from any convenient source through a belt 15. The shafts of the feed-rolls are connected together by suitable gears 16.

Arranged upon the frame of the machine is a suitable shaft 17, that has mounted thereon a loose pulley 18. This pulley is driven by means of a belt 19, that extends around the pulley 18 and around a pulley 20 upon the shaft of the feed-wheel hereinbefore described. A belt 21 also passes around this pulley 18 and around a pulley 23, mounted upon a suitable bearing on the frame of the machine. The shaft 17 is provided with a series of radiating arms 25, and the belt 21 is provided with a projecting lug 27, and each time that this lug passes around the pulley 18 it engages one of the arms 25 and gives the shaft 17 a partial revolution. The shaft is provided with a series of cams, and these cams control and operate various parts of the mechanism of the machine. One of the cams 26 engages a lever 28, pivoted upon a stud 29, and, passing through a guide 31 and its opposite end, is provided with a stud 31, that engages a socket in the underside of a coiler 33, that is loosely mounted upon the shaft of the upper feed-roll. The bearing of this shaft, at the end which carries the feed-roll, is in a vertical box 35, that is arranged to slide in a standard 36, and is held down so as to keep its feed-roll in engagement with the other feed-rolls by means of a spring 37, upon which rests a plate 38, that is engaged by an adjusting-screw 39. By this means, at proper intervals of time, the feed-rolls are separated and the feed of the wire ceases, and then the rolls are again allowed to come in contact with each other and the feed of the wire is continued.

The wire-coiler is arranged in front of the feed-rolls, so that the wire as it leaves the feed-roll enters this coiler and is there brought into the desired spiral form. This coiler consists, preferably, of a tube 41, within which is mounted a core 42, that just fills the tube, and has in its outer surface a groove 43. This groove is preferably straight for the first portion of its length and then extends spirally around the core 42. The forward end of the core is of smaller diameter than the tube, and this portion, which we designate as an "extension" 44, projects beyond the coiler and nearly to the receiver, hereinafter referred to. A set-screw 45 is provided, by means of which the core 42 may be secured in position in the tube 41. It is desirable to provide means by which the size of the coil and its length may be regulated. For this purpose we provide in the core 44, just in front of the tube 41, a guide 46, that is held in position by a set-screw 47 and is capable of adjustment, so as to bring the eye or opening in the guide nearer to or farther from the surface of the extension 44. The wire as it leaves the coiler passes through the eye in this guide, and the position of the guide determines the diameter of the spiral of the coil. By moving the guide out so as to bring the eye or opening therein some distance from the surface of the extension 44 the wire passing through it will be set so as to make the coil of considerably larger diameter than it was when it passed out of the coiler. By this means the diameter of the coil may be regulated.

For the purpose of regulating the length of the coil we arrange a guide 49 in front of the coiler and partially embracing the extension 44. This guide is provided on its front face, or that which is farthest from the coiler, with a spiral surface approximating the spiral of the coil. This guide is secured to an adjustable rod 51, passing through suitable bearings, where it is held in position by nuts 53. By means of these nuts the rod and guide may be adjusted so as to bring the guide in any desired relation to the end of the coiler. When it is desired to increase the size of the coil, the guide is adjusted so that the advancing wire will strike the spiral face of the guide, and to pass the guide must be drawn into a longer spiral. The wire will then be set in a spiral determined by the position of this guide, and by this means the wire may be given any desired length of spiral.

Arranged in front of the coiler and at a short distance from the end of the extension 44 is a trough-shaped receiver 55, into which the coil passes after it leaves the extension 44. A sliding plate 57 is arranged in the bottom of this receiver, its edges being located in grooves in the walls of the receiver. This plate is provided with a series of upwardly-projecting pins 59, and these pins have at their tops, preferably, the heads 61, which project both forward and back from the pins, extending in a direction parallel with the receiver. At its forward end the plate is provided with an upwardly-projecting pin 63, that engages a cam-groove 65 in a wheel 67. This wheel is driven in the manner hereinafter described, and thereby the plate 57 is moved back and forth in the receiver, and with it the pins 59, hereinbefore referred to. In running the wire into the receiver the plate 57 is so placed and the pins thereon are so located that as the end of the wire passes the first pin it strikes the curved surface of the pin, and, sliding forward over that surface, the coil is somewhat stretched or distended, and as the wire progresses through the receiver its forward end strikes each pin at substantially the same point, and the wire is drawn forward by each pin in substantially the manner described. The result of this is that the path of the wire through the receiver is thus accurately predetermined, and the forward pull or tension on the wire enables us to control it throughout its entire movement. As the wire reaches the first pin and passes by it considerable tension is created on the wire, one point of resistance being this pin and the other point being the coiler or some fixed point or device in front of the coiler against which the wire bears. While the wire remains in contact with the first pin its free end passes beyond this pin and passes on until it reaches the second pin, which it strikes at substantially the same point. The wire passes this pin, and the friction on the first pin is then relieved. This operation is repeated throughout the length of travel of the wire, substantially the only friction being between the wire at a point near its end and the pin or pins that this part of the wire is passing. The forward end of the wire may thus be said to "creep" from one pin to the next, while the rear portions of the wire may be entirely out of contact with the pins and running freely, as shown in the detail view, Fig. 7. It will be seen that the plate 37 at the bottom and the walls of the receiver at the sides prevent the wire from moving out of its course and compel it to pass through the receiver from one end as far as it may be run toward the other end. It is necessary, however, to provide means for preventing the wire from moving up out of the receiver before the prescribed time. This device consists of a plate 69, hinged to the wall of the receiver, and kept in position by a curved guide-arm 71, upon which is a coiled spring 73. This spring bearing against the plate 69 holds it in position against the side of the receiver. Secured to the top of the plate 69 is a projection 75, passing over the top of the receiver and provided with a beveled inner edge that is arranged to project into the space between two of the coils at the edge of the fabric. This engagement with the fabric holds the last coil in position for the running wire to engage it, and also prevents the running wire from moving up and getting out of the receiver. After the last coil is run into the fabric the fabric is fed one step, preferably by the means hereinafter described, and as the fabric is pulled upward the plate 69 yields slightly, so as to permit the coil engaged by the projection 75 to pass that projection. The fabric is then stopped, and this projection again enters the space between the last two coils, and thus holds the last coil in the position to receive the next one. As a further provision for preventing the coils in the receiver from moving up out of the receiver, we provide the pins 59 with the heads 61, hereinbefore described. These heads engage the last two coils projecting into the space or notch formed by the crossing wires, as shown in Fig. 5 and as shown by the full lines in Fig. 15. By this means the last completed coil is held down into position to receive the next running wire. After this is done the plate is moved from the position shown by full lines in Fig. 15 to the position shown by dotted lines in the same figure. The fabric is then advanced and the portion of the head that projects on the other side of the pin next engages the wires of the last two coils, and the pins are in position to guide the next running wire into engagement with the last coil. It will also be noticed that the tension on the wire by reason of its engagement with the pins, as described, would cause the wire when the pins were moved to follow the pins, and if this occured the last wire would not be in proper position to receive the next wire. To obviate this we prefer to provide means which prevents the wire from moving back with the pins as they are moved. To accomplish this we arrange a shaft 77, connected, as hereinafter described, with suitable means for rocking it, and this shaft is provided with an arm 79, that engages the vertically-moving rods 81. These rods are arranged by the side of and in line with two of the pins 59, and they are provided with heads 83, having the inclined forward sides. These rods 81 pass through the movable plate 57 and move with said plate as it is moved in the receiver. The arm 79 extends between the rods 81, as shown in Fig. 6, so that these rods are free to move with the plate, while the arm on the rock-shaft remains stationary. The movements of these rods are so timed that as the plate 57 is moved toward the coiler these rods are depressed, and their inclined surfaces engaging the wire prevents the wire from moving backward or toward the coiler with the pins, as it would otherwise tend to do. As the next movement of the plate takes place the rods 81 rise again to the position shown in Fig. 5. We have already referred to the shaft 17 and the means for operating it. This shaft is provided with a cam 85, and a rod 87 is provided with a roll 89, that bears against the surface of this cam. A spring 91 is connected to this bar and holds the roll 89 against the surface of the cam 85. A stationary knife 93 is arranged in position for the wire to pass over it, and a pivoted knife 95 is arranged in proximity to the knife 93 and is connected to the bar 87. After the wire has been run far enough to form a coil of the desired length the knife 95 is moved so as to cut off the wire. The wire is stopped while being cut by the separation of the feed-rolls, as hereinbefore described. It is often desirable to run several wires side by side, so as to form a fabric consisting of double wires. This necessitates the feeding of one or more wires after the preceding wire has been coiled and before the fabric is advanced. It would sometimes occur after the wire was cut by the knife that if it were attempted to advance another wire its end would strike the end of the wire already coiled, and thus cause one of the wires to be doubled up or thrown out of position. To obviate this we provide upon the shaft 17 a cam 97. A rod 99 is provided with a roll 101, that bears upon the cam 97, and the rod 99 is connected to a spring 103, which holds the roll 101 against the cam 97. This cam is shown in outline by dotted lines in Fig. 11. The rod 99 is provided with a depending arm 105, having a pin that engages a slotted lug 107 upon a rock-shaft 109. The other end of the rock-shaft 109 is provided with a disk 110, having thereon a pin 111. A bell-crank lever 113 is pivoted upon the disk 110, and its arm projects through a slot in the machine-frame at a point a little in advance of the knife 93, so that the wire coil lies over this slot when the wire is cut off. Just after the wire is cut the rock-shaft 109 is given a partial rotation. The upright arm of the bell-crank lever 113 passes vertically through the slot in the frame, its other arm being weighted and thereby held in a horizontal position. After the end of the bell-crank lever has projected through the slot and come behind one of the bends in the wire the pin 111 strikes the horizontal arm of the lever 113 and, raising it, throws the other arm forward, thereby moving the rear end of the coiled wire and bringing it out of the path of the end of the advancing wire, so that this wire may be run into the receiver and lie by the side of the wire already in the receiver. This will cause two wires to be laid side by side, and any desired number of wires may thus be run into the machine.

After the wire fabric is formed it passes between the corrugated feed-rolls 115, that are mounted in suitable bearings in the frame of the machine and are preferably located above and a little to one side of the receiver, hereinbefore referred to. These feed-rolls are geared together by means of the gears 117, and upon the shaft of one of these rolls is mounted the cam-wheel 67, previously referred to. This roll is also provided with a gear-wheel 118, that meshes with the gear-wheel 119 upon the shaft 120. As the rolls 115 are quite long, we prefer to mount them in bearings by which they are supported at several points throughout their length. The bearings for the lower roll are arranged below the roll, and the bearings for the upper roll are arranged above the roll, and are supported by means of the arched casting 121. By this means it will be seen that the movement of the fabric between the rolls is not interfered with. We also prefer to construct these feed-rolls with corrugated surfaces, each corrugation consisting of a curved channel running the full length of the roll, so that the fabric as it lies between the rolls is grasped at the opposite sides of the coils, as shown in Fig 3. The shaft 120 is provided with a ratchet-wheel 123. A lever 125 is journaled upon this shaft and is provided with a dog 127, that engages the ratchet 123, being held in connection therewith by means of the spring 129. It will be seen that as the lever 125 is raised the roll 120 will be turned by reason of the engagement of the pawl 127 with the ratchet 123, and as the lever 125 is lowered the pawl 127 will pass over the ratchet and the shaft 120 will remain stationary.

Upon the shaft 17 is a cam 130, and a vertical bar 131 passes through a suitable guide 133 upon the frame of the machine, and is provided with the rolls 135, between which rests the cam 130. An arm 137 is connected to the bar 131, and a link 138 connects this arm with the lever 125. As the shaft 17 is rotated the lever 125 is raised or lowered, and thereby the shaft 120 is turned, and through it the feed-rolls 115 are rotated and the plate 57, carrying the guide-pin, is moved back and forth in the receiver. If it is desired to feed a greater number of wires for any coil, so as to form a fabric some coils of which consist of several wires, we provide means by which at regular intervals the pawl 127 will be thrown out of engagement with the ratchet 123, and thereby during one or more operations of the lever 125 the feed-rolls will not be turned. This device consists, preferably, of a disk-wheel 139, mounted upon a short shaft secured upon the lever 125. The periphery of this disk is provided with openings, into which may be inserted pins 140. These pins are of sufficient length to engage the pawl 127 as the disk is rotated. A shaft 141 is mounted in bearings supported upon the lever 125, and is provided with a worm 143, that engages a worm-wheel 144 upon the shaft of the disk-wheel 139. The shaft 141 is also provided with a ratchet-wheel 145. An arm 146 is pivoted upon the shaft 141 and is provided with a spring-dog 147, that engages the ratchet 145. A link 148 is connected to the arm 146 and to a stationary part in the frame of the machine. It will be seen that by this means at each time the lever 125 is raised the ratchet 145 will be turned one notch, and thereby that the disk-wheel 139 will be slowly rotated, and that in the course of this rotation one of its pins will engage the pawl 127 and disengage it from its ratchet, and that during that up-and-down movement of the lever 125 the feed-rolls will not be turned. If, for example, it is desired to run six single wires, making six single coils, and then to run two wires, making a double coil, the pins in the disk-wheel will be so arranged that for six movements of the lever 125 the feed-rolls will operate every time, and that for the next movement of the lever 125 the feed-rolls will remain stationary.

It sometimes occurs that the wire becomes doubled up, and this generally occurs at a point just in front of the coiler. It is then necessary to stop the machine, and we prefer to provide means whereby the machine will be automatically stopped if the wire doubles up at this point. For this purpose we provide a belt-shifter 151, that engages the belt 15. A spring 152 engages this belt-shifter and tends to move it so as to carry the belt off from the fast pulley 13 onto the loose pulley 14. A lever 153 is pivoted in a standard 155, and its end comes at a short distance above the extension 44 of the coiler. The opposite end of this lever is connected by a link 157 with the belt-shifter 151. When the parts are in the position shown in Fig. 13, the belt-shifter will hold the belt on the pulley 13. Should the wire double up under the lever 153, one end of this lever will be thrown up and the other down, thus releasing the belt-shifter and permitting the spring to throw the lever over and move the belt onto the loose pulley, thus stopping the machine.

Instead of employing the pins with the cross-heads on them for permitting the fabric to advance only one coil at a time, we may use any other suitable means for this purpose and the corrugated feed-roll may be entirely dispensed with. In Figs. 19, 20, and 21 we have shown an arrangement that may be used for this purpose. As here shown, the heads on the pins 59 are omitted and cross-pins 160 are secured upon a slide 161. These pins are opposite each other and are so arranged that as one set of pins is moved forward the other is drawn back. The pins that are drawn back disengage one coil of the fabric and the pins that engage the next coil. This permits the fabric to move up one coil at a time and brings the last coil into position to receive the next wire.

In Figs. 16, 17, and 18 we have shown a modified construction by which we are enabled to dispense with the feed-rolls for moving the fabric. In this instance the receiver 55 is open at both top and bottom, and the fabric passes out at the bottom of the receiver. The spring-supported plate 75 is also arranged at the bottom of the receiver and engages and supports one of the coils. This plate is withdrawn whenever the fabric is to advance. Two sets of pins 163 are here employed, and the pins are arranged to alternate with each other. These pins also take the place of the pins 59 and serve to stretch the wire. As the wire passes along in the receiver it engages all of the pins of one set, the fabric being supported by resting on the other set of pins. After the wire is run the pins then supporting the fabric are withdrawn and the wire drops down into the other set of pins. Then the first set of pins are returned to their former position, and another wire is run, as before. The weight of the fabric is in this instance the only means employed for moving the fabric, the pins serving to support the fabric and regulate its movement. These cross-pins might also be used in connection with the receiver and feed-rolls shown in Figs. 1 and 3, in which case they would take the place of the vertical pins shown in those figures.

We may use suitable means for winding the completed fabric. In Figs. 1, 2, and 3 we have shown an automatic device for this purpose. This consists of a shaft 175, provided with fast and loose pulleys and operated by a belt 177. A roll 179, upon which the fabric is wound, is driven from the shaft 175 by means of gears 181. A shaft 183 is geared to the shaft 175, and these two shafts are supplied with guide or flattening rolls 185, and at suitable intervals these rolls may be provided with the cutter 187. A belt-shifter 188 is connected to the belt and is adapted to be operated by a weighted arm 186. A rod 184 is mounted on the shaft 175 and rests on the top of the fabric, as shown in Fig. 3. This rod is provided with a lug that supports the weighted arm 186. As the fabric is made and becomes slack, as indicated by dotted lines in Fig. 3, the rod 184 drops down and permits the weighted arm to shift the belt, causing the winder to start. As the fabric is wound up it strikes the belt-shifter and moves it over and stops the winding device.

We do not in this application claim the described method of running the wire, having claimed the same in a separate application for Patent, Serial No. 383,458, filed March 2, 1891, as a division of this application.

We claim as our invention—

1. The combination, with a suitable coiler, of a series of pins or projections located in the path of the advancing wire, whereby the coiled wire after it leaves the coiler is subjected to suitable tension by contact with said pins.

2. The combination, with a suitable coiler, of a series of pins or projections located in the path of the advancing wire and constructed to give tension thereto, and means for moving said pins, substantially as described.

3. The combination, with a coiler, of means for feeding the wire and means arranged in the path of the running coil to urge its forward end ahead and thereby produce a longitudinal tension in the coil.

4. The combination, with a suitable wire-coiler, of means for guiding the coiled wire into engagement with the spirals of a previously-made coil after it passes the coiler, and means for subjecting the spirals of the wire to a desired amount of tension as they interlock with the preceding coil.

5. In a machine for forming coiled-wire fabrics, means for coiling the wire and means for guiding the coiled wire as it advances to cause the same to interlock with the preceding coil or coils and simultaneously subjecting the spirals to a desired amount of tension, substantially as described.

6. The combination, with a wire-coiler, of a longitudinally-adjustable guide arranged in front of said coiler and against which the wire bears as it leaves the coiler, whereby the length of the coil of the wire may be regulated, substantially as described.

7. The combination, with a wire-coiler, of a radially-adjustable guide arranged in front of said coiler, whereby the diameter of the spiral may be adjusted, substantially as described.

8. The combination, with the coiler consisting of a stationary tube 41 and a spirally-grooved core 42, arranged in said tube, of feed-rolls for moving the wire through said coiler, and the longitudinally-adjustable guide 49, arranged in front of said coiler and against which the wire bears as it leaves the coiler, substantially as described.

9. The combination, in a wire-coiler, of the tube 42, the spirally-grooved core arranged therein, means for feeding the wire through said coiler, and the radially-adjustable guide 46, arranged in front of said coiler and provided with an eye or groove through which the wire passes, substantially as described.

10. In a machine for making coiled-wire fabric, the combination, with the wire-coiler, of means for cutting off the wire and means for moving the end of the wire that is cut off out of the way of the end of the running wire without moving the entire coil, whereby two wires may be run side by side, substantially as described.

11. In a machine of the class described, the combination, with a wire-coiler, of a receiver or guide having a longitudinal outlet, and a plate projecting partially across the exit-opening of the receiver into the longitudinal space between two of the coils for holding the final coil in said receiver while the running wire is passed through it, substantially as described.

12. In a machine of the class described, the combination, with a wire-coiler, of a receiver or guides, a plate projecting partially across the exit-opening of the receiver into the longitudinal space between two of the coils for holding the last coil in said receiver while the running wire is passed through it, and means for feeding the fabric from said receiver one coil at a time, substantially as described.

13. In a machine of the class described, the combination, with means for coiling the wire, of a receiver, means for holding a final coil in said receiver while the running wire is passed through it, and means for guiding the running wire and exerting a tension upon each spiral thereof while it passes through said receiver and interlocks with the final coil therein.

14. In a machine of the class described, the combination, with means for coiling the wire, of a receiver or guide, means for holding the final coil therein and feeding it therefrom one coil at a time, means for exerting a tension upon each spiral of the running wire as it passes through said receiver and interlocks with the final coil therein, and means for regulating the size of the coil, substantially as described.

15. In a machine of the class described, the combination, with a wire-coiler, of a tripping-lever arranged in front of said coiler and adapted to be engaged by the wire whenever it doubles up in front of said coiler, and a stop mechanism connecting with said lever, substantially as described.

16. In a machine of the class described, the combination of means for coiling the wire and passing the running wire through the final coil of the fabric, means for feeding the fabric, and means for intermitting the feed whenever extra wires are to be inserted in any part of the fabric, substantially as described.

17. The combination, with the means for coiling the wire, of a guide or receiver having an open bottom through which the wire fabric passes, alternating pins projecting into said receiver from opposite sides thereof, and means for withdrawing one series of said pins after the formation of each coil or coils, for the purpose set forth.

18. In a machine of the class described, the combination, with means for coiling the wire, of means for engaging each coil as it is formed and supporting the fabric thereby and releasing said coil after the formation of a new coil and permitting the weight of the fabric to move the fabric into position for the running of the next wire, substantially as described.

19. The combination, in a machine of the class described, with means for coiling the wire, of the guide or receiver and the series of pins 59, arranged in said receiver and adapted to exert a tension upon each spiral of the wire as it is run through said receiver, substantially as described.

20. The combination, in a machine of the class described, with the means for coiling the wire, of means for cutting the wire, the guide or receiver, and suitable pins or projections located in the guide or receiver and adapted to cause a tension upon each spiral of the wire as it is run through the receiver, substantially as described.

21. The combination, in a machine of the class described, with means for coiling the wire, of means for cutting the wire, the guide or receiver, pins or projections arranged in said guide and adapted to cause a tension upon the spirals as the wire is run through the receiver, and means for holding the final coil in the guide.

22. The combination, in a machine of the class described, with means for coiling the wire, of means for interlocking the running wire with the preceding coil and simultaneously exerting a tension upon the spirals of said running wire, means for cutting the wire, and means for stopping and starting the wire, arranged to coact in order.

23. The combination, in a machine of the class described, with means for coiling the wire, of the guide or receiver, and means adjustable in the receiver for moving the final coil longitudinally in said receiver without moving the previously-formed fabric.

24. The combination, in a machine of the class described, with means for coiling the wire, of the guide or receiver and pins or projections arranged in said guide, means for supporting said pins, and means for moving said pins lengthwise of the receiver to move the final coil longitudinally, substantially as described.

25. The combination, with the wire-coiler, of a receiver in alignment therewith, the plate 75, arranged to project partially across the receiver into the space between two coils of the fabric, and means for withdrawing said plate to permit the coils to pass out of the receiver.

26. The combination, with the receiver having a longitudinal outlet-opening, of the plate 75, arranged to project partially across the receiver and provided with a bevel edge, substantially as described, and for the purpose set forth.

27. The combination, with the receiver, of the tension-pins 59, arranged therein, and the transverse holding-pins 160, constructed to engage the fabric and hold the last coil in position to receive the running coil, substantially as described.

28. The combination, with the coiler and the receiver in line therewith, of the tension-pins 59 and the movable plate 57, supporting said pins in said receiver.

29. The combination, with the receiver, of the tension-pins 59, the transverse holding-pins 160, and the plate 75 for holding the coil in said receiver.

In testimony whereof we have hereunto set our hands this 19th day of August, 1890.

CLARENCE O. WHITE.
MARSHALL B. LLOYD.

In presence of—
A. M. GASKILL,
C. E. VAN DOREN.